T. T. S. LAIDLY.
Primer for Fire-Arms.
No. 302. A. I. Patented Oct. 9, 1860.
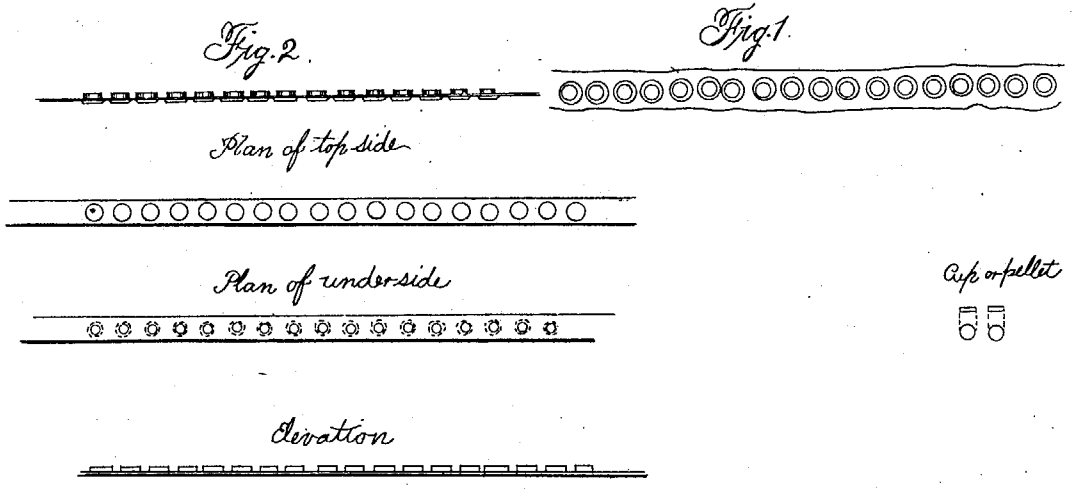
Witnesses,
Jonas P. Keller
Wm. B. Giles
T. T. S. Laidly.
N. PETERS, PHOTO-LITHOGRAPHER, WASHINGTON, D. C.

UNITED STATES PATENT OFFICE.

THEODORE T. S. LAIDLEY, OF UNITED STATES ARMY.

IMPROVEMENT IN TAPE PRIMER FOR FIRE-ARMS.

Specification forming part of Letters Patent No. 22,957, dated February 15, 1859; Additional Improvement No. 302, dated February 9, 1860.

*To all whom it may concern:*

Be it known that I, THEODORE T. S. LAIDLEY, of the Army, have made additional Improvements in my Tape Primer; and I do hereby declare that the following is a full and exact description thereof.

The nature of my improvement consists in making the strip which connects the primers of a single piece of tin, alloy, or other soft metal or other suitable material, and by a particular management of the dies and punches which make the indentations or recesses for the cups or pellets which contain the percussion-powder to raise in the opposite direction a burr, which, being pressed down after the cup or pellet is in place, secures it firmly and prevents it from falling out.

Figures 1 and 2 represent the plan of the under side and the elevation of a strip with the recesses formed and the burr raised ready for the insertion of the cup or pellet containing the percussion-powder; or the cups may be held in place by making the recesses a little deeper than the cup or pellet, and then subject the strip to pressure, by which the metal is forced close against the sides of the pellet or partly over the edge of the cup or pellet, and thus secure it in its place; or the cup or pellet may be held in place in the indentation or recess by means of a cement or easily-fusible solder, which melts at a lower temperature than that required for the explosion of the percussion-powder. The percussion-powder may be placed in a thin cup of tin, copper, or other suitable substance, or in two cups, the open end of one placed in the open end of the other; and the open end of the cup may be placed in the bottom of the recess or indentation made in the strip to receive it, the cup thus protecting the percussion-powder from moisture or fire; or a circular disk of copper, paper, or varnish may be placed in the recess before the cup is put in its place; or the open end of the cup may be turned outward and the powder protected as the percussion-cap. I have tried these different ways of making the pinions and have found them to answer a good purpose. Other and various ways might be adopted, modifications of the plan above described. My patent for improvements in tape primers covers the case where the cups or pellets are inserted in indentations formed in a strip of paper or other substance, the pellet being held in place by pasting over the surface of the strip a second strip.

I prefer to hold the cup or pellet containing the percussion-powder in place in its hollow or recess by pressing the metal or substance forming the strip firmly against the sides of the pellet, or partly over the edge of the cup or pellet, thus riveting it, as it were, in its place; or by holding the pellet securely in the recess or indentation by means of a cement or fusible alloy; and it is this that I claim as my additional improvement.

I am aware that tape primers have been made heretofore by forming indentations in a strip of metal and pressing in the indentation percussion-powder, then covering the whole surface of the strip or each cup thus formed by a thin metallic covering held to the first by a glue, cement, or fusible solder. It forms no part of my invention to attach wafers containing percussion-powder to the plain surface of a strip of paper or metal by means of glue or paste, as these wafers would be readily detached by the feed-finger or ratchet-wheel which it is intended shall feed the primers forward, and this plan has already been proposed without being found to answer the purpose.

I do not claim these modes of making tape primers; but

What I claim as my invention, and desire to secure by Letters Patent, is—

Making a continuous tape primer by inserting a cup or pellet containing the percussion-powder in a recess or indentation formed in a strip of soft metal, alloy, india-rubber, gutta-percha, or other suitable material, and holding the cup or pellet in place by pressing the metal or substance of the strip partly over the outer edge of the pellet or cup, or by an easily-fusible solder securing the cup to the strip, or by means of a cement for that purpose.

T. T. S. LAIDLEY.

Attest:

JOHN S. HOLLINGSHEAD,
JONAS P. KELLER.